United States Patent
Kindberg et al.

(10) Patent No.: US 8,767,007 B2
(45) Date of Patent: Jul. 1, 2014

(54) PROCESSING IMAGES OF A DISPLAY

(75) Inventors: Timothy Paul James Kindberg, Bristol (GB); Andrew C. Goris, Loveland, CO (US); Timothy Louis Kohler, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 497 days.

(21) Appl. No.: 13/125,645

(22) PCT Filed: Oct. 22, 2008

(86) PCT No.: PCT/US2008/080816
§ 371 (c)(1),
(2), (4) Date: Jul. 11, 2011

(87) PCT Pub. No.: WO2010/047702
PCT Pub. Date: Apr. 29, 2010

(65) Prior Publication Data
US 2011/0316876 A1    Dec. 29, 2011

(51) Int. Cl.
*G09G 5/00*    (2006.01)
(52) U.S. Cl.
USPC .......................................... 345/619; 348/607
(58) Field of Classification Search
USPC ....................... 345/619; 382/305; 375/240.27
See application file for complete search history.

(56) References Cited

U.S. PATENT DOCUMENTS

| | | | | |
|---|---|---|---|---|
| 5,057,916 A | * | 10/1991 | Krause et al. | 375/240.12 |
| 5,262,856 A | * | 11/1993 | Lippman et al. | 375/240.12 |
| 5,598,226 A | * | 1/1997 | Kokaram | 348/607 |
| 7,296,747 B2 | | 11/2007 | Rohs | |
| 2002/0028015 A1 | | 3/2002 | Tack-don et al. | |
| 2006/0291558 A1 | * | 12/2006 | Schreier et al. | 375/240.13 |
| 2008/0024467 A1 | * | 1/2008 | Collins et al. | 345/204 |

FOREIGN PATENT DOCUMENTS

WO  WO-03046804      5/2003
WO  WO-2007055492    5/2007

OTHER PUBLICATIONS

Collomosse, J. P. et al., "Screen Codes: Visual Hyperlinks for Displays", downloaded Oct. 21, 2008.
Robinson, G., "New App Reads Barcodes on iPhone", http://www.geek.com/new-app-reads-barcodes-on-iphone-20080815/, Aug. 2008.

* cited by examiner

Primary Examiner — M Good Johnson

(57) ABSTRACT

An apparatus for processing images of a display includes an image sequence receiving module adapted to receive a first sequence of images of the display. The first sequence of images includes at least one image corrupted due to partial refreshing of the display. The apparatus also includes an image processing module operable to process the first sequence of images on an image by image basis to eliminate the at least one corrupted image from at least one of the first sequence of images and a second sequence of images captured subsequent to the first sequence of images.

15 Claims, 7 Drawing Sheets

PROCESSING IMAGES OF A DISPLAY

RELATED APPLICATIONS

The present invention is related to GB Serial No. 0714666.5, titled, "Content Encoder and Decoder and Methods of Encoding and Decoding Content," filed on Jul. 27, 2007; GB Serial No. 0714664.0, titled, "An Encoder and Decoder And Methods of Encoding and Decoding Sequence Information," filed on Jul. 27, 2007; GB Serial No. 0714661.6, titled, "A Method of Generating a Sequence of Display-Frames for Display on a Display Device" filed on Jul. 27, 2008; application Ser. No. 13/122,433, titled, "Altering An Imaging Parameter To Read A Symbol," and application Ser. No. 13/125,571, titled, "Obtaining A Resource To Read A Symbol." The disclosures of the above-identified documents are hereby incorporated-by-reference in their entireties.

BACKGROUND

Conventional barcodes have enabled items, such as goods for sale or mail within a mail system, to be marked and later identified by suitable reader devices. Further, it is increasingly becoming a more and more established practice to use conventional barcodes to move content from the Internet to mobile devices and vice versa.

Conventionally taking the form of 1D or 2D barcode symbologies, for instance, UPC Symbology (Universal Product Code), Datamatrix Symbology (ISO/IEC16022—International Symbology Specification), QR Codes (JIS X 0510, ISO/IEC 18004:2000, ISO/IEC 18004:2006), or Color Codes, "mobile codes" are printed in newspapers, magazines, on signs, buses, business cards, embedded in content of web pages, displayed on monitors, and on just about any other display that a user might desire. Mobile codes are then "imaged" by a camera-equipped mobile phone. The mobile codes are then used by the camera-equipped mobile phone as a basis for uploading and downloading content and services.

Typically, mobile codes are relatively large in relation to the available screen "real-estate" of the monitors on which they are often displayed. For instance, in a first example of a music store having a monitor that displays a mobile code usable to download a music track, the same display may also show a music video corresponding to the music track. Moreover, it may be that the music store monitor is additionally displaying the name of the song, the artist, and so forth. In this situation, the "real estate" of the display is very limited for displaying conventional mobile codes. Second, conventional mobile codes typically are aesthetically-disruptive and therefore distract from the quality of viewing experience. Even a mobile code having a data size as little as 100 bytes may unacceptably reduce the quality of viewing experience. Third, to further complicate the situation, it is not at all uncommon that a display itself is very small, such as in a second example of a printer-display or a third example of a mobile phone display. Finally, camera-equipped mobile phones tend to have relatively poor resolution and optics; and that alone make it harder for camera-equipped mobile phones to easily identify mobile codes, particularly when an image (of a mobile code) is degraded, for instance, due to environmental conditions such as glare, a shaking hand, obstruction, or other disruption.

It would therefore be beneficial to have a system that enables mobile codes to be read by camera-equipped imaging devices in a manner that is substantially less damaging on the quality of viewing experience.

BRIEF DESCRIPTION OF THE DRAWINGS

Features of the present invention will become apparent to those skilled in the art from the following description with reference to the figures, such reference being made by way of example only, in which.

DETAILED DESCRIPTION OF THE INVENTION

Figure 1A:
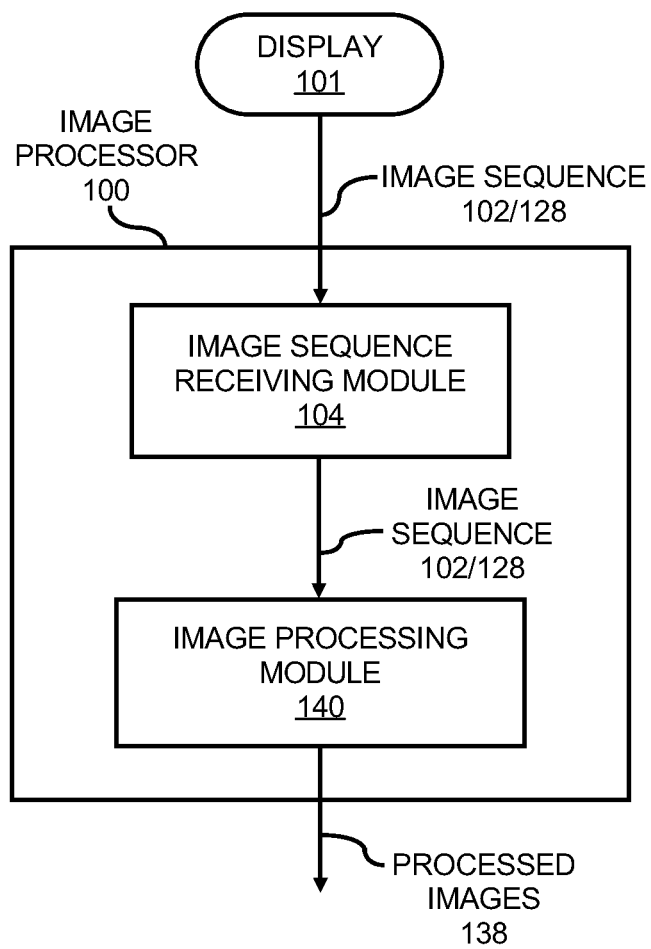
FIG. 1A shows a simplified block diagram of an image processor configured to perform various functions described herein, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein is a method for processing images of a display and an apparatus configured to perform the method. In one example, the images are processed to eliminate images corrupted due to partial refreshing of the display. The images may be corrupted due to screen refreshes, dim cycles, etc., which may appear as flicker to a viewer of the images. The corrupted images may thus have a dimmed, garbled or otherwise degraded appearance.

In another example, the images are processed to enable more accurate reading of a visually-symbolic resource embedded in images displayed on a display, for instance, a digital display The visually-symbolic resource substantially minimizes the use of display "real estate," substantially maximizes the density of data for any given area of a display, and accommodates the resolution and optics of an imaging device, for instance, a camera-equipped mobile phone, a smart phone, a personal data assistant (PDA), etc. In one regard, the method and apparatus disclosed herein enable the user of a camera-equipped imaging device to simultaneously be mobile and be able to easily access content over the Internet and/or other network.

Through implementation of the method and apparatus disclosed herein, a robust mechanism is provided that processes images to substantially eliminate corrupted images from at least one of a first sequence of images of the display, which may be a currently captured or stored sequence of images of the display, and a second sequence of images of the same display, which may comprise a sequence of images of the display captured subsequent to the first sequence of images of the display. The second sequence of images of the display may be continuous in time with the first sequence of images of the display and thus immediately follow the first sequence of images forming a longer sequence of images of the same display or may be captured after some time has elapsed from the capture of the first sequence of images of the display. In addition, the robust mechanism trades space occupied on a display against the time needed to decode a "visually-symbolic resource" electronically embedded in images displayed on the display.

Initially, "visual-symbolic resources" are summarized with regard to 1) the context of where they are read, 2) what they are designed to perform, and 3) what they comprise.

First, a "visually-symbolic resource" is embedded in any one or more portions of video, frame, image, or picture, etc., and may be displayed alone, or in combination, as any one or more of a partial or full frame, image, or picture. In this regard for instance, a "visually-symbolic resource" is electronically embedded in a frame, image or picture, and read from a display, which may be digital or otherwise.

Second, in an example, a user having a camera-equipped imaging device captures a sequence of images from a display. For instance, this "imaging" may cause the imaging device's browser, or an equivalent element thereof, to launch and redirect to a programmed URL, to obtain one or more items. In addition, this "imaging" may result in recognition of in-line content. Essentially, the visually-symbolic resource operates to one or more of directly provide, or indirectly assist, locate, or link to one or more server, network, content provider, service, application, or combination thereof. The act of linking to and from physical world objects may generally be referred to as a "hard link" or a "physical world hyperlink."

By way of particular example, the display may be a web page and an imaging device may use the "visually-symbolic resource" to access items of interest, such as, downloading one or more of a ring tone, a music sample, a map, a schedule, etc., including directly reading in-line content, such as a phone number, a coupon, a business card, etc. A user may also generate and display a visually-symbolic resource for others to scan. In an example, however, a computer or program is likely to generate the visually-symbolic resource. For instance, a visually-symbolic resource may store a business card that is embedded in the display of a mobile phone, which may then be scanned by another mobile phone.

Third, a visually-symbolic resource may comprise a 1D or 2D barcode or other form of mobile code. Due to its very nature, a visually-symbolic resource may essentially also comprise a map between one or more partial or whole visual-symbols to one or more partial or whole messages. The features of a visually-symbolic resource may include one or more of fine grain elements, varying shapes, sizes, specialized color palettes, etc. A visually-symbolic resource may be more visually-appealing and occupy less display screen "real estate" than a conventional mobile code. In addition, the features of visually-symbolic resources further comprise one or more of partial or whole characters, codes, symbols, languages, applications, programs, functional markers, etc. For instance, the terms visually-symbolic resource comprises one or more portions of a tag, visual-tag, hyperlink, a visual-hyperlink, mobile code, source code, screen code, barcode, visual-barcode, hyperlink data, datum, barcode data, URL, glyph, data glyph, meta data, and information such as a phone number, business card, coupon, airline ticket, software, firmware, program, programming, signal, signaling, or any other portion of data or code. In this regard, features of the terms visually-symbolic resource may further comprise any of one or more portion of a circle, line, bar, start, stop, space, quiet zone, etc, Turning first to FIG. 1A, there is shown a simplified block diagram of an image processor 100 configured to perform various functions described herein, according to an example. It should be understood that the image processor 100 may include additional components and that some of the components described herein may be removed and/or modified without departing from the scope of the image processor 100. Furthermore, it should be understood that the image processor 100 may include an imaging pipeline component, such as, a digital signal processor, or any number of imaging pipeline components, which may be implemented in the operation of the image processor 100.

The image processor 100 may comprise software, firmware, and/or hardware configured to process an image. By way of example, a camera-equipped image processing device may comprise the image processor 100. A camera-equipped image processing device may be, for instance, a camera-equipped cellular telephone, a digital still camera having a video recording mode and/or a "live view" mode, a digital video camera, a camera-equipped personal digital assistant (PDA), a computing device equipped with a camera, and a computing device in communication with a camera, etc.

As shown in FIG. 1A, the image processor 100 includes an image sequence receiving module 104 and an image processing module 140. The image sequence receiving module 104 is configured to receive a sequence of images 102 of a display 101. The image sequence receiving module 104 may also receive a second sequence of images 128 of the display 101, either continuous with the first sequence so as to immediately follow the first sequence of images 102 or after a period of time following receipt of the first sequence of images 102. The second sequence of images 128 may thus form part of the first sequence of images 102. In any event, the first sequence of images 102 may include at least one image corrupted due to partial refreshing of the display. The first sequence of images 102 may be corrupted due to other environmental conditions, such as, glare, a shaking hand, obstruction, etc.

According to an example, the image sequences 102/128 may be supportable in any number of formats without departing from a scope of the present invention, for instance, JPEG, MPEG, PNG, BMP, GIF, TIFF, etc. However, the image processor 100 may also be configured to process raw and uncompressed images. In this regard, the image processor 100 may process images in the lower-level image processing pipeline instead of processing images with an image processing application that interfaces with the higher-level API. In an example, the imaging pipeline is controlled by instructions programmed in firmware stored in one or more of the components of the image processor 100.

By taking this approach to finer-tuned adjustments in the lower-level imaging pipeline instead of using high-level applications and a (camera-equipped imaging) device API, the image processor 100 is relatively fast, powerful, and robust. A more detailed discussion of a customized approach to altering low-level imaging parameters, including focus, exposure, tone curve, white balance, and offset to more efficiently and effectively read barcodes is described in co-pending and commonly assigned application Ser. No. 13/122,433. For example, the refresh-rate of the display may be detected or determined by using rudimental imaging parameters to relatively quickly process the raw images.

The image processing module 140 is configured to process the first image sequence 102 to eliminate the at least one corrupted image from at least one of the first image sequence 102 and the second image sequence 128.

According to a first example, the image processing module 140 identifies images in the first image sequence 102 that are likely to be corrupted, for instance, due to partial refreshing of the display. The image processing module 140 may identify those images based upon a refresh-rate or a refresh-timing of the display 101. In addition, or alternatively, the image processing module 140 may analyze the contents of the images to determine which of the images are likely corrupted, for instance, through detection of discontinuities in the image, through detection of deviations from other images, etc.

According to a second example, the image processing module 140 is configured to determine a phase-offset from a refresh-timing of the display 101. The refresh-timing of the display 101 may be defined as when the display 101 refreshes. The phase-offset may be used to produce a sample time control signal (FIG. 1C, 116) that may be used in capturing images of the display 101 to substantially ensure that the images are captured in between screen refreshes.

In the examples above, the image processing module 140 may further produce processed images 138 with the at least one corrupted image eliminated from at least one of the first sequence of images 102 and the second sequence of images 128.

According to an example, the image processor 100 may operate to process a sequence of images during a "live-view" mode instead of processing a previously recorded video. More particularly, for instance, the image processor 100 may process a sequence of images in a mode that effectively displays, for instance, on a screen of a camera-equipped apparatus, a live video that has been processed to eliminate corrupted images. In this example, an image in a sequence of images may be temporarily stored in one or more registers and the stored images may be processed to produce one or more resources, a video feed in which corrupted images have been eliminated or both.

In an additional example, the image processor 100 may operate to store a sequence of images in a manner that the image sequence may be played back before image processing or stored after image processing.

In yet another example, images corrupted by screen refreshes are not automatically eliminated. Instead, when a user of a camera-equipped apparatus perceives flicker in a sequence of images 102, the user may actively cause subsequently captured images to be captured in between screen refreshes, thereby avoiding the capture of images likely to cause flicker. As an option, the user may activate this feature whenever flicker appears. As another example, instead of avoiding the capture of images, the user may actively cause corrupted images to be eliminated, as discussed below. As such, a user may avoid spurious elimination of images, for instance, when the camera is pointed at a rapidly changing scene with a strong horizontal line.

Although the image processor 100 may perform other functions, the image processor 100 is operable with a camera-equipped image processing device to process images read from a display. In one regard, the image processor 100 may "image" the display to read a "visually-symbolic resource" that has been electronically embedded in the display. The term "display" refers to an electronic device, digital or otherwise, that represents information in visual form intended to communicate one or more particular impressions. As will be discussed in further detail, the display is "imaged" so as to capture one or more sequence of images of the display and the image processor 100 processes the captured one or more sequence of images of the display.

Various aspects of the image processor 100 and the image processing module 140 will be described in view of the following figures.

Figure 1B:
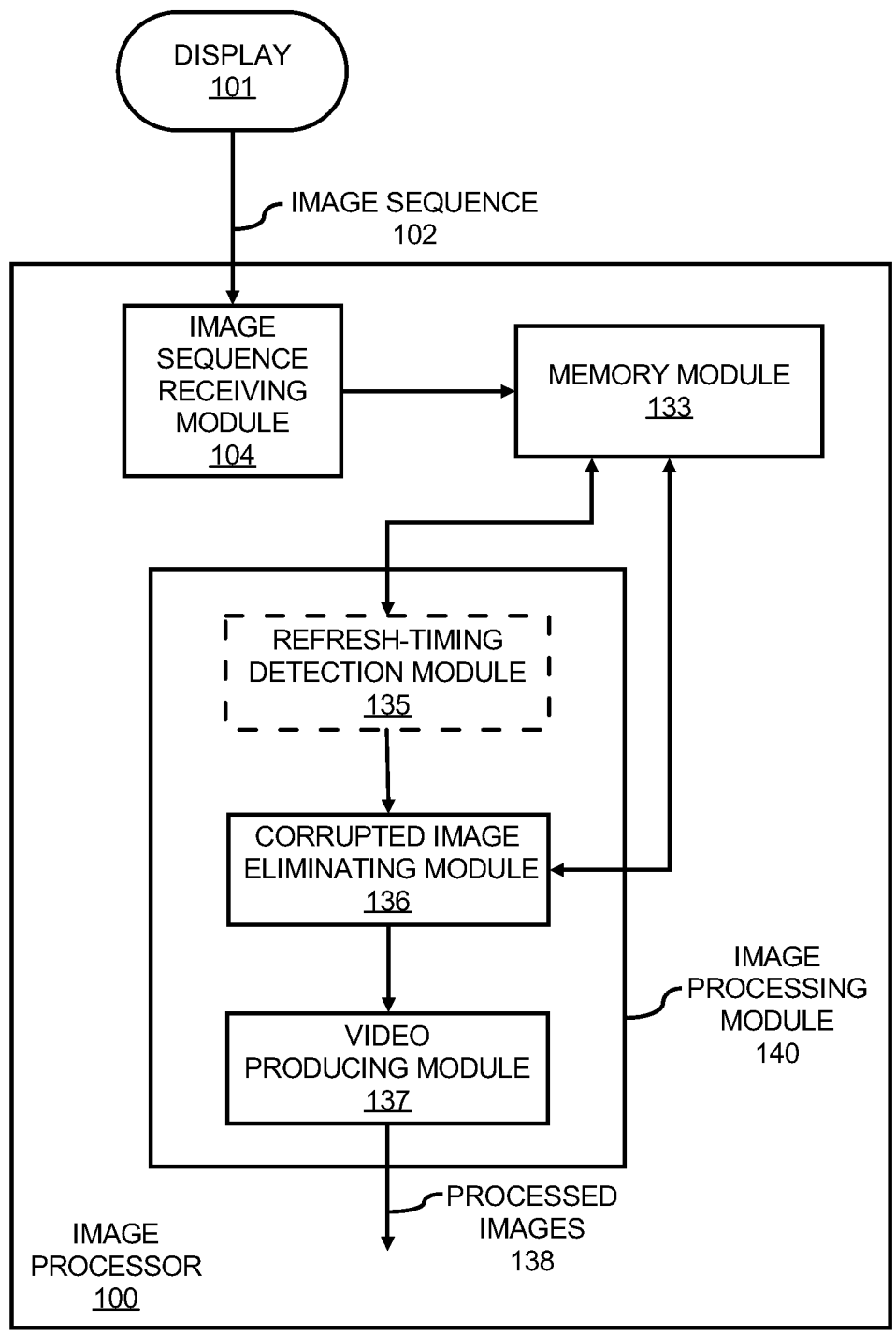
FIGS. 1B-1D, respectively, show more detailed simplified block diagrams of the image processor depicted in FIG. 1A, according to embodiments of the invention.

Turning first to FIG. 1B, there is shown a more detailed simplified block diagram of the image processor 100 depicted in FIG. 1A, according to an example. In FIG. 1B, components having similar reference numerals to the reference numerals recited in FIG. 1A may have similar functionalities. In addition, it should be understood that the image processor 100 may include additional components and that some of the components described herein may be removed and/or modified without departing from a scope of the image processor 100.

Generally speaking, the image processor 100 depicted in FIG. 1B is configured to produce processed images 138 in which corrupted images from a first sequence of images 102 have been eliminated. In this example, the image processing module 140 includes a corrupted image eliminating module 136 and a video producing module 137.

As shown, the image sequence receiving module 104 is configured to receive a first image sequence 102. The corrupted image eliminating module 136 is configured to receive the first image sequence 102 and to eliminate corrupted images from the first image sequence 102.

According to a first example, the image processing module 140 receives or is otherwise aware of a predetermined refresh-timing of the display 101. In this example, the corrupted image eliminating module 136 is configured to eliminate those images that have been captured during the predetermined refresh-timing of the display 101.

According to a second example, the image processing module 140 includes a refresh-timing detection module 135 configured to detect the refresh-timing of the display 101. The refresh-timing detection module 135 has been bounded in a dashed line box to indicate that it is an optional module in the image processing module 140. In this example, in the event that the image processing module 140 has received or is otherwise aware of a refresh-rate of the display 101, the refresh-timing module 135 is configured to determine at least one instance of a screen refresh from the image sequence 102 and to determine those images that were captured during the refresh-times as determined from the refresh-rate and the at least one instance of the screen refresh. In addition, the corrupted image eliminating module 136 is configured to eliminate those images determined to have been captured during the refresh-times.

In another example, the refresh-timing detection module 135 may perform an iterative process to determine the refresh-timing of the display 101. More particularly, for instance, the refresh-timing detection module 135 may select a likely first refresh-rate, such as, a refresh-rate between 50-60 Hz, and may identify at least one degraded image. The refresh-timing detection module 135 may analyze one or more subsequent images captured at the first refresh-rate from the identified at least one degraded image. If the one or more subsequent images are not degraded, the refresh-timing detection module 135 selects a likely second refresh-rate and repeats the above-described process until the refresh-timing detection module 135 detects the refresh-timing of the display 101.

In a further example, the corrupted image eliminating module 136 may analyze the sequence of images 102 to determine which of the images are likely to be corrupted. The corrupted image eliminating module 136 may analyze the images to determine which of the images are likely to be corrupted through detection of discontinuities in the images, through detection of deviations from other images, etc. In this example, the corrupted image eliminating module 136 is configured to eliminate all of the images in the image sequence 102 that are likely corrupted.

In a yet further example, the refresh-timing detection module 135 may analyze a series of images in the first image sequence 102 to determine the refresh-timing of the display 101. More particularly, for instance, the refresh-timing detection module 135 is configured to locate at least two images that are likely to be corrupted and to detect the refresh-timing of the display 101 from the at least two images. In this example, the corrupted image eliminating module 136 is configured to eliminate images captured during the detected refresh-timing.

The image processor 100 is depicted as also including an optional memory module 133. If equipped, the memory module 133 may comprise a temporary register, volatile or non-volatile memory, etc., where the first image sequence 102 may be stored before the image sequence 102 is communicated to either the refresh-timing detection module 135 or the corrupted image eliminating module 136.

In any of the examples above, the video producing module 137 is configured to produce processed images 138 in which the corrupted images have been removed from the first image sequence 102. The processed images 138 may be output to a display, to the memory module 133 for storage, to another storage device, etc.

Figure 1C:
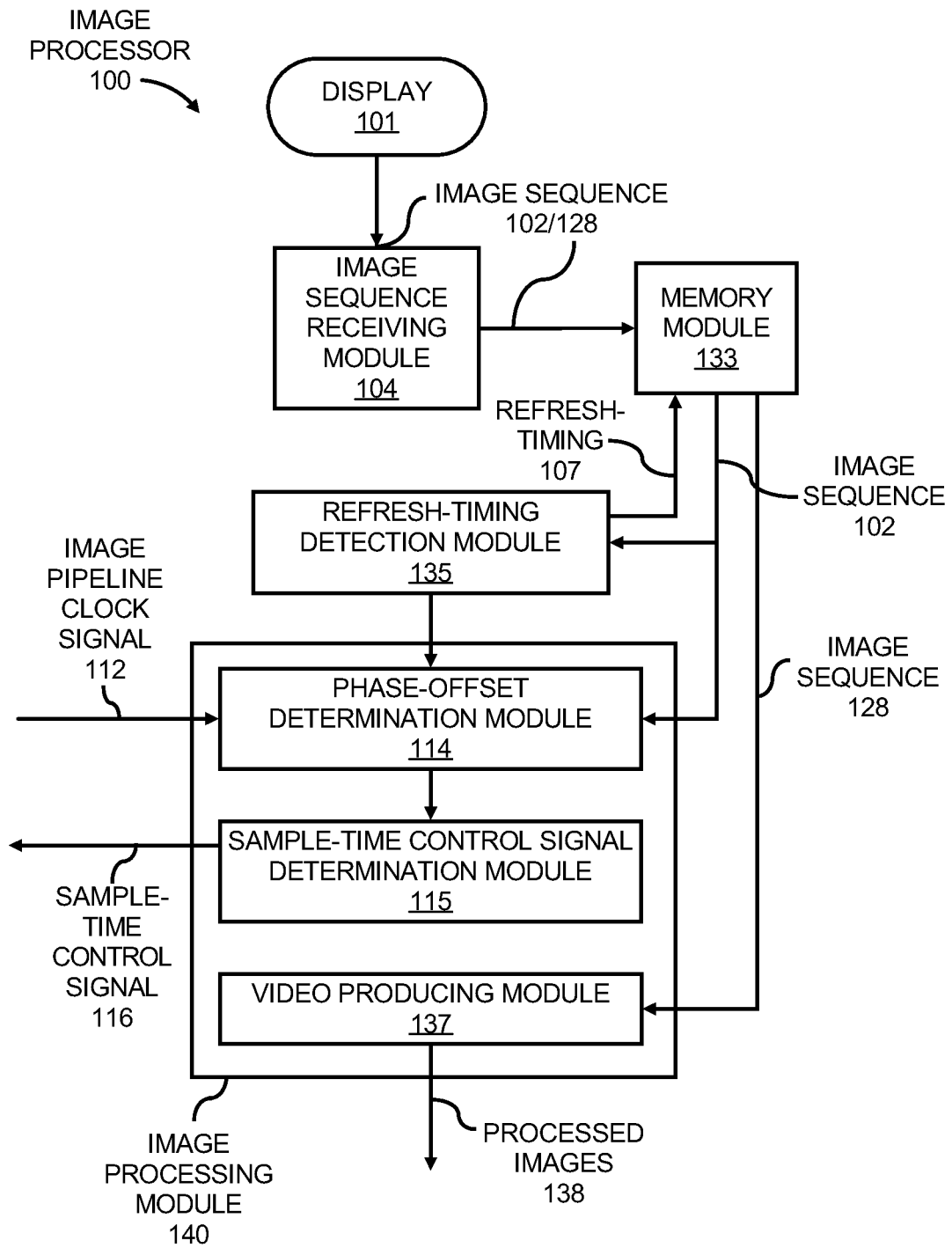

Turning now to FIG. 1C, there is shown a more detailed simplified block diagram of the image processor 100 depicted in FIG. 1A, according to another example. In FIG. 1C, components having similar reference numerals to the reference numerals recited in FIGS. 1A and 1B may have similar functionalities. In addition, it should be understood that the image processor 100 may include additional components and that some of the components described herein may be removed and/or modified without departing from a scope of the image processor 100.

Generally speaking, the image processor 100 depicted in FIG. 1C is configured to produce processed images 138 in which corrupted images from either or both of a first sequence of images 102 and a second sequence of images 128 has been eliminated. In this example, the image processor 100 is depicted as including an image sequence receiving module 104, a memory module 133 and an image processing module 140. The image processor 100 is also depicted as optionally including a refresh-timing detection module 135. The refresh-timing detection module 135 is considered optional because the image processor 100 is configured to produce processed images 138 without detecting the refresh-timing of the display 101 in various instances, as described in greater detail herein below.

The image processing module 140 includes a phase-offset determination module 114 and a sample-time control signal determination module 115. The image processing module 140 is also depicted as including a corrupted image eliminating module 136 and a video producing module 137.

According to a first example, the image processing module 140 receives or is otherwise aware of a predetermined refresh-timing of the display 101. In this example, the phase-offset determination module 114 is configured to determine a phase-offset from the predetermined refresh-timing of the display 101, wherein the phase-offset comprises deviation in phase from the refresh-timing of the display 101. The phase-offset determination module 114 is configured to communicate the phase-offset to the sample-time control signal determination module 115.

The sample-time control signal determination module 115 is configured to produce a sample time control signal 116 that may be used in capturing images of the display 101 to substantially ensure that the images are captured in between screen refreshes. In one example, the sample-time control signal 116 may be employed in capturing a second sequence of images 128, to thus substantially ensure that the images likely to be corrupted are avoided by capturing images between screen refreshes of the display 101.

According to another example in which the image processing module 140 has received or is otherwise aware of a refresh-rate of the display 101, the refresh-timing detection module 135 is configured to determine at least one instance of a screen refresh from the image sequence 102 and to determine a refresh-timing 107 of the display 101 from the refresh-rate and the at least one instance of the screen refresh. The refresh-timing detection module 135 is configured to communicate the refresh-timing 107 to the phase-offset determination module 114. In addition, or alternatively, the refresh-timing detection module 135 may store the determined refresh-timing 107 in the memory module 133.

The phase-offset determination module 114 receives the refresh-timing 107 from either the refresh-timing detection module 135 or the memory module 133. In addition, the phase-offset determination module 114 receives an image pipeline clock signal 112. The phase-offset determination module 114 adds a phase deviation to the refresh-timing 107 using the image pipeline clock signal 112 as a baseline for the phase deviation to determine the phase-offset. The phase-offset determination module 114 determines a virtual-clock, which is characterized as having the same frequency as the refresh-rate of the display 101, but offset in phase by the phase deviation.

In addition, the sample-time control signal determination module 115 is configured to produce a sample time control signal 116 using the phase-offset as discussed above in the first example. As an example, the sample-time control signal 116 may be just an instance of a clock corresponding to the virtual clock. In addition, the sample-time control signal 116 may be synchronized to the image pipeline clock 112. Furthermore, the sample-time control signal 116 is produced as a basis to sample/capture/acquire a second image sequence 128.

In another example, the refresh-timing detection module 135 may perform an iterative process to determine the refresh-timing 107 of the display 101. More particularly, for instance, the refresh-timing detection module 135 may select a likely first refresh-rate, such as, a refresh-rate between 50-60 Hz, and may identify at least one corrupted image. The refresh-timing detection module 135 may analyze one or more subsequent images captured at the first refresh-rate from the identified at least one corrupted image. If the one or more subsequent images are not corrupted, the refresh-timing detection module 135 selects a likely second refresh-rate and repeats the above-described process until the refresh-timing detection module 135 detects the refresh-timing 107 of the display 101. Similarly to the previous example, the phase-offset determination module 114 uses the refresh-timing 107 to determine the phase-offset of the display 101. In addition, the sample-time control signal determination module 115 is configured to determine a sample-time control signal 116 as also discussed above.

In a further example, the refresh-timing detection module 135 may analyze a series of images in the image sequence 102 to determine the refresh-timing 107 of the display 101. More particularly, for instance, the refresh-timing detection module 135 is configured to locate at least two images that are likely to be corrupted and to detect the refresh-timing of the display 101 from the at least two images. Similarly to the previous example, the phase-offset determination module 114 uses the refresh-timing 107 to determine the phase-offset of the display 101. In addition, the sample-time control signal determination module 115 is configured to determine a sample-time control signal 116 as also discussed above.

In the examples above, the sample-time control signal 116 is used to capture a second sequence of images 128, to thus substantially ensure that the images likely to be corrupted due to screen refreshes are avoided by capturing images between screen refreshes of the display 101. In addition, the video producing module 137 produces a processed video 138 from the second sequence of images 128.

Figure 1D:
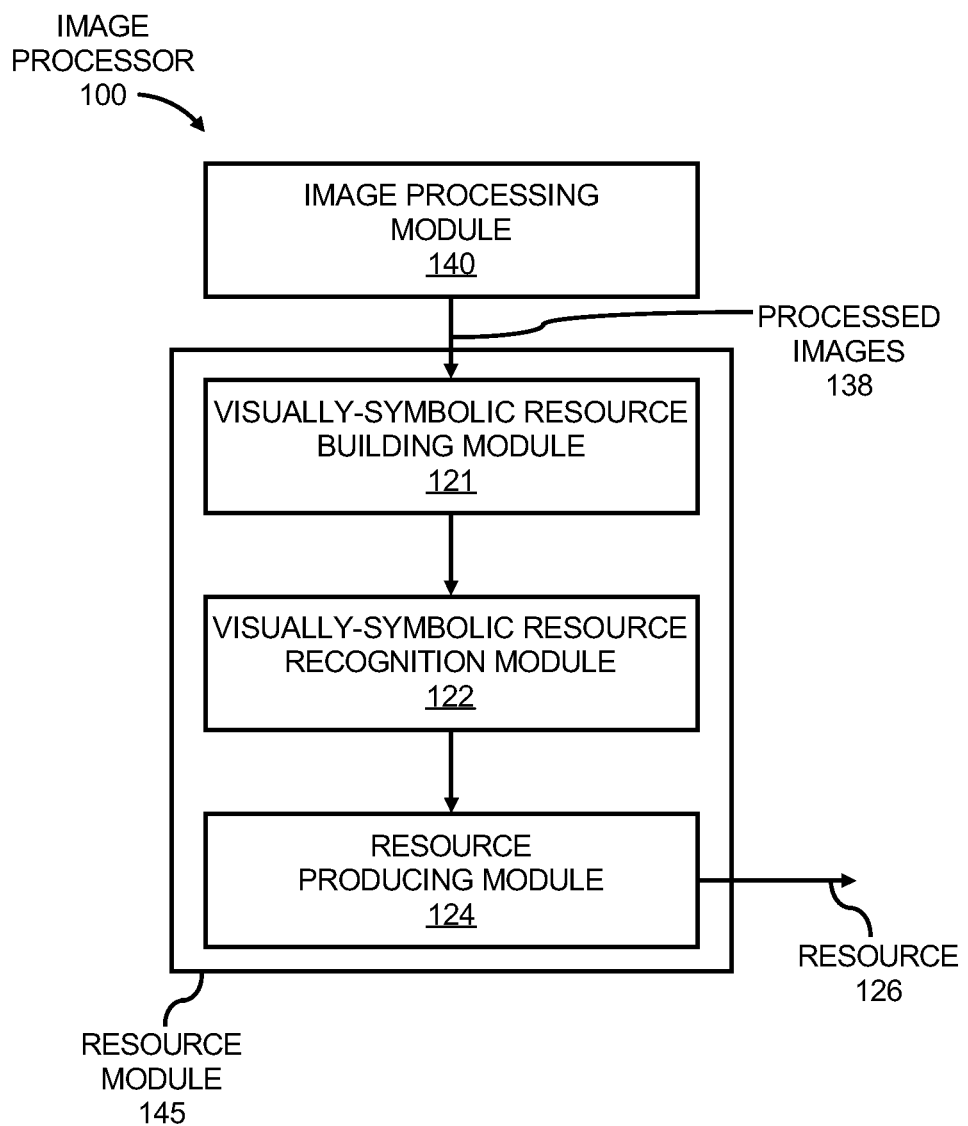

With reference now to FIG. 1D, there is shown a more detailed simplified block diagram of the image processor 100 depicted in FIGS. 1A-1C, according to an example. In FIG. 1D, components having similar reference numerals to the reference numerals recited in FIGS. 1A-1C may have similar functionalities. In addition, it should be understood that the image processor 100 may include additional components and that some of the components described herein may be removed and/or modified without departing from a scope of the image processor 100.

As shown in FIG. 1D, the image processor 100 is depicted as further including the image processing module 140 and a resource module 145. The resource module 145 includes a visually-symbolic resource building module 121, a visually-symbolic resource recognition module 122 and a resource producing module 124. In addition, the processed images 138 produced by the image processing module 140 as described in any of FIGS. 1A-1C is inputted into the visually-symbolic resource building module 121.

The visually-symbolic resource building module 121 builds a visually-symbolic resource from the processed images 138. According to an example, portions of the visually-symbolic resource are contained in multiple images of the processed images 138, for instance, to save valuable real estate in each of the images displayed on the display 101. In this example, the visually-symbolic resource building module 121 may identify and eliminate duplicative portions. In addition, the visually-symbolic resource building module 121 is configured to append the remaining portions to build the visually-symbolic resource.

The visually-symbolic resource building module 121 communicates the visually-symbolic resource to the visually-symbolic resource recognition module 122. In one example, if the visually-symbolic resource recognition module 122 recognizes the visually-symbolic resource, the visually-symbolic resource recognition module 122 may communicate the content associated with the visually-symbolic resource to the resource producing module 124. In addition, the resource producing module 124 may output the content as a resource 126. By way of example, the resource 126 may comprise in-line content displayed for a user, in-line content outputted from an electronic device, a resource locator, such as, a hyperlink, etc.

In another example, in the event that the visually-symbolic resource recognition module 122 fails to recognize the visually-symbolic resource, the visually-symbolic resource recognition module 122 is configured to communicate the visually-symbolic resource to the resource producing module 124. In addition, the resource producing module 124 is configured to produce a resource 126 based on the visually-symbolic resource. The resource 126, in this example, comprises a resource locator, for instance, a hyperlink to various content, for instance, available over a network, such as, the Internet.

A customized approach to obtaining a resource to read a symbol is disclosed in the copending PCT application Ser. No. 13/125,571 titled "Obtaining A Resource To Read A Symbol". That application for patent pertains to an approach of constructively resolving what happens if the visually-symbolic resource recognition module 122 does not recognize a visually-symbolic resource. Essentially, images of suspected but unrecognized visually-symbolic resources are sent to a symbol identification service that, as an example, sends a reader to the camera-equipped imaging device to ultimately recognize the visually-symbolic resource.

Examples of methods in which the image processor 100 may be employed to process an image will now be described with respect to the following flow diagrams of the methods 200-220 and 250 respectively depicted in FIGS. 2A-2D. It should be apparent to those of ordinary skill in the art that other steps may be added or existing steps may be removed, modified or rearranged without departing from the scopes of the methods 200-220 and 250.

The descriptions of the methods 200-220 and 250 are made with reference to the image processor 100 illustrated in FIGS. 1A-1D. Thus, these descriptions refer to the elements cited in FIGS. 1A-1D. It should, however, be understood that the methods 200-220 and 250 are not limited to the elements set forth in the image processor 100. Instead, it should be understood that the methods 200-220 and 250 may be practiced by an image processor having a different configuration than that set forth in the image processor 100.

Some or all of the operations set forth in the methods 200-220 and 250 may be contained as utilities, programs or subprograms, in any desired computer accessible medium. In addition, the methods 200-220 and 250 may be embodied by computer programs, which may exist in a variety of forms both active and inactive. For example, they may exist as software program(s) comprised of program instructions in source code, object code, executable code or other formats in compressed or uncompressed form. Any of the above may be embodied on a computer readable medium, which includes storage devices.

Exemplary computer readable storage devices that may be used to implement the present invention include but are not limited to conventional computer system RAM, ROM, EPROM, EPROM and magnetic or optical disks or tapes. Concrete examples of the foregoing include distribution of the programs on a CD ROM or via Internet download. In a sense, the Internet itself is a computer readable medium. The same is true of computer networks in general. It is therefore to be understood that any electronic device and/or system capable of executing the functions of the above-described embodiments are encompassed by the present invention.

A controller, such as a processor (not shown), ASIC, microcontroller, etc., may implement or execute the image processors 100 to perform one or more of the methods 200-220 and 250 in processing images. Alternatively, the image processor 100 may be configured to operate independently of any other processor or computing device.

Figure 2A:
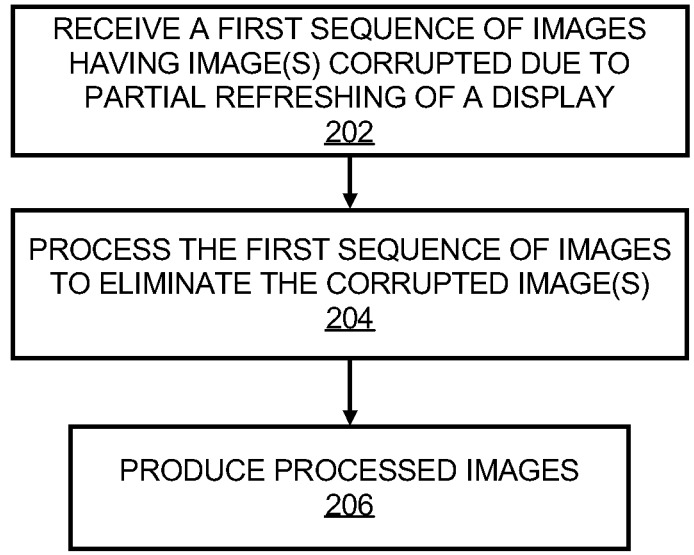
FIG. 2A illustrates a flow diagram of a method of processing images of a display, according to an embodiment of the invention.

With reference first to FIG. 2A, there is shown a flow diagram of a method 200 of processing images of a display

101, according to an example. At step 202, a first sequence of images 102 of the display 101 is received. The first sequence of images 102 contains at least one image corrupted due to partial refreshing of the display 101.

In addition, at step 204, the first sequence of images 102 is processed on an image by image basis to substantially eliminate the at least one corrupted image from at least one of the first sequence of images 102 and a second sequence of images 128 captured subsequently to the first sequence of images 102.

At step 206, at least one of the first sequence of images 102 and the second sequence of images 128 is produced as a processed images 138.

Figure 2B:
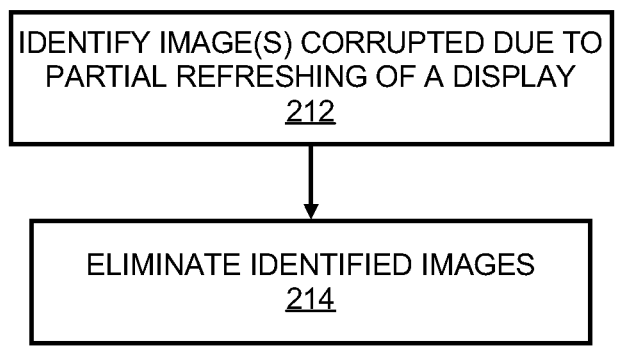
FIG. 2B illustrates a flow diagram of a method of processing the first sequence of images depicted in FIG. 2A to eliminate at least one corrupted image from at least one of the first sequence of images and the second sequence of images, according to an embodiment of the invention.

Turning now to FIG. 2B, there is shown a flow diagram of a method 210 of processing the first sequence of images 102 depicted in FIG. 2A to eliminate the at least one corrupted image from at least one of the first sequence of images 102 and the second sequence of images 128, according to an example. In other words, FIG. 2B depicts a more detailed description of step 204 in FIG. 2A.

At step 212, the corrupted image eliminating module 136 (FIG. 1B) identifies which of the images in the first sequence of images 102 are degraded or otherwise likely to be corrupted in the first sequence of images 102. As described with respect to FIG. 1B, either or both of the corrupted image eliminating module 136 and the refresh-timing detection module 135 are configured to identify the corrupted images through use of the various examples discussed above.

At step 214, the corrupted image eliminating module 136 eliminates the images identified as being degraded or otherwise likely to be corrupted in the first sequence of images 102.

Figure 2C:
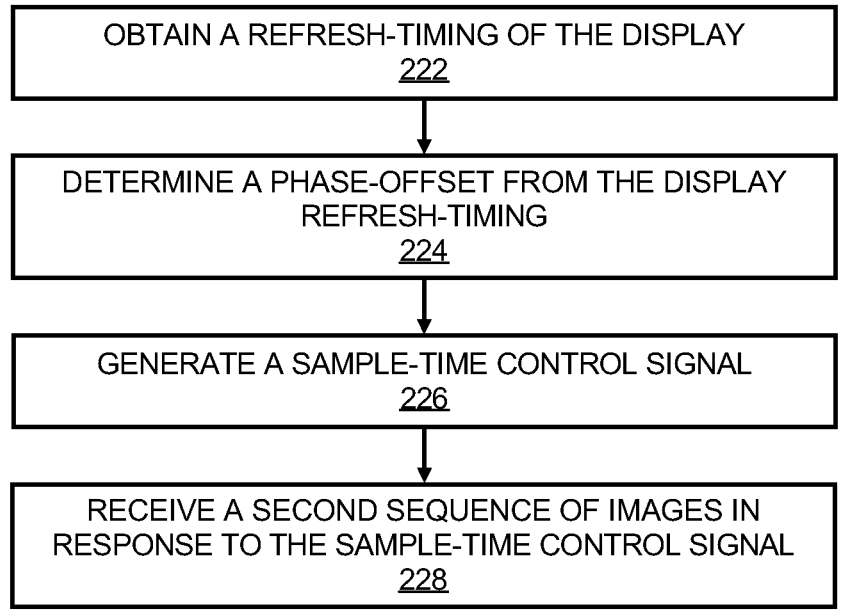
FIG. 2C illustrates a flow diagram of a method of processing the first sequence of images depicted in FIG. 2A to eliminate corrupted images from at least one of the first sequence of images and the second sequence of images, according to another embodiment of the invention.

Turning now to FIG. 2C, there is shown a flow diagram of a method 220 of processing the first sequence of images 102 depicted in FIG. 2A to eliminate corrupted images from at least one of the first sequence of images 102 and the second sequence of images 128, according to another example. In other words, FIG. 2C also depicts a more detailed description of step 204 in FIG. 2A.

At step 222, the refresh-timing 107 of the display 101 is obtained. As described above with respect to FIG. 1C, the refresh-timing 107 may be obtained in a variety of different manners. For instance, the refresh-timing 107 may be predetermined and inputted into the image processing module 140. As another example, the refresh-timing 107 may be determined through an analysis of either or both of the refresh-rate of the display 101 and characteristics of the images (such as, discontinuities in one or more of the images) contained in the first video 102.

At step 224 the phase-offset determination module 114 determines a phase-offset from the obtained refresh-timing of the display 101, wherein the phase-offset comprises deviation in phase from the refresh-timing of the display 101, as also discussed above with respect to FIG. 1C.

At step 226, the sample-time control signal determination module 115 is configured to produce a sample time control signal 116 that may be used in capturing images of the display 101 to substantially ensure that the images are captured in between screen refreshes, as further discussed above with respect to FIG. 1C.

At step 228, the image sequence receiving module 104 receives a second sequence of images 128 in response to the sample-time control signal 116, where the second sequence of images 128 comprises images of the display 101 in between refreshes of the display according to the sample-time control signal 116. As such, the first sequence of images 102 may be analyzed to determine the phase-offset used to generate the sample-time control signal 116 employed to capture the second sequence of images 128, which is captured while substantially avoiding the capture of images likely to be corrupted in the second sequence of images 128.

Figure 2D:
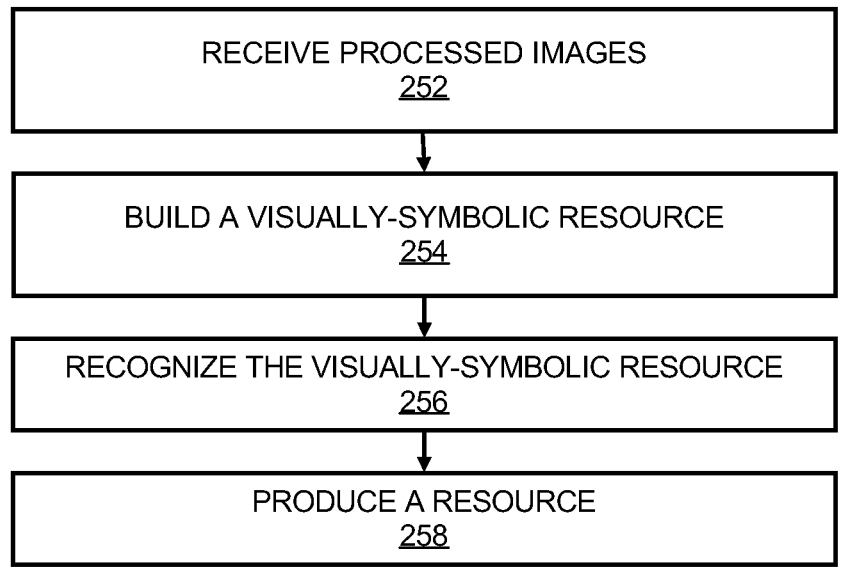
FIG. 2D illustrates a flow diagram of a method of producing a resource from at least one of a processed first sequence of images and a processed second sequence of images depicted in FIGS. 2A-2C, according to an embodiment of the invention.

Turning now to FIG. 2D, there is shown a flow diagram of a method 250 of producing a resource from at least one of a processed first sequence of images 102 and a processed second sequence of images 128, according to an example. The method 250 may be performed to produce a resource from the processed images 138 produced following implementation of the method 200 (FIG. 2A), as well as, the methods 210 and 220 (FIGS. 2B and 2C).

At step 252, the visually-symbolic resource building module 121 receives the processed images 138, which may comprise either the processed first sequence of images 102 or the processed second sequence of images 128.

At step 254, the visually-symbolic resource building module 121 builds a visually-symbolic resource from the processed images 138. The visually-symbolic resource building module 121 may build the visually-symbolic resource in any of the manners discussed above with respect to FIG. 1D.

At step 256, the visually-symbolic resource recognition module 122 either recognizes the visually-symbolic resource or communicates the visually-symbolic resource to the resource producing module 124, as further discussed above with respect to FIG. 1D.

At step 258, the resource producing module 124 produces a resource 126, which may comprise in-line content displayed for a user, in-line content outputted from an electronic device, and/or a resource locator, for instance, a hyperlink to various content, for instance, available over a network, such as, the Internet.

According to an example, through implementation of the methods 200-220 and 250, time and energy may be saved by reducing or substantially eliminating the time required for error detection and correction of images degraded due to screen refreshes and dimming. In this regard, error (and thus the need for error correction) is reduced but may not be necessarily entirely avoided. For instance, error unrelated to screen refreshes and dimming may be detected and corrected. For instance, error attributable to a reflection of the screen (glare), a shaking hand, obstruction, or attributable to other disruption unrelated to screen refreshing and dimming may be detected and corrected. In a further example, the number of error correction bits needed in total is reduced by substantially avoiding degraded images attributable to refreshes and dimming in the capture of the image sequence 128. This lowers the overall time needed to read a complete sequence of portions of a visually-symbolic resource. For a visually-symbolic resource that resembles a Datamatrix-like symbology, this means reducing error detection elements in the corners of one or more portions of a visually-symbolic resource (in which such error detection elements take up space otherwise usable for valuable data and other terms of a visually-symbolic resource.)

A particular example in the context of downloading content from a web-fixed device to an imaging-equipped device implementing the methods 200 and 250 will now be described. In this example, the display 101 comprises a display in a music store, which displays a visually-symbolic resource that comprises a visual hyperlink to a music track. The user of the imaging-equipped device captures a sequence of images 102 of the display, which includes the visually-symbolic resource. The image processor 100 may employ a low-level imaging pipeline to automatically identify the visually-symbolic resource, as described with respect to FIGS. 1A-1D. In addition, the visually-symbolic resource is wirelessly communicated to a server containing the music track and wirelessly downloads the music track from the server through use of the resource.

In a second example that concerns uploading content from a device containing the image processor 100 to the Internet and/or one or more other network, the user captures a sequence of images 102 of a display of a printer using the device. Similar to the first example, the device uses a low-level imaging pipeline and the image processor 100 to identify a visually-symbolic resource "imaged" from the display. Also similar to the first example, the image processor 100 hyperlinks to the Internet and/or one or more other network after identifying the visually-symbolic resource to, for instance, obtain an IP address of the printer. In addition, the device may upload content to the printer with the IP address to, for instance, to cause the printer to print desired content. For instance, the printer may print a picture that was capture with the device, a business card, one or more phone numbers, passenger tickets, etc.

In other examples, the display may be a web page, or other display, where the "visually-symbolic resource" is usable to access items of interest comprising downloading one or more of ring tones, music samples, maps, schedules, etc. The imaging device may need one or more program, data structure, coordinate, vector, etc., needed to carry out a function of the lower-level imaging pipeline, for instance, to enable the item of interest to be implemented on the imaging device. As an example, a customized approach to obtaining a resource is disclosed in the copending PCT application Ser. No. 13/125,571.

In all or nearly all of the examples, uploading and downloading may be implemented via Wi-Fi, for instance, various standards under IEEE Standard 802.11, Bluetooth, for instance, IEEE Standards 802.15.1-2002, 802.15.1-2005, and later versions of Bluetooth, or some combination thereof. It should be recognized, however, that the present invention may be practiced with other suitable means of uploading and downloading and that the present invention is therefore not limited to these standards.

A visually-symbolic resource, such as, a visual-hyperlink for example, may be embedded in display content and the visually-symbolic resource may be read from the display content, as discussed in a paper co-authored by J. P. Colomosse and Timothy Paul James Kindberg, titled "Screen Codes: Visual Hyperlinks for Displays," published on Feb. 26, 2008, hereby incorporated-by-reference in its entirety. In a second example, a customized approach to generating code sequences for embedding in a display is disclosed in GB Application Serial No. 0714661.6. In a third example, a customized approach for displaying a series of video frames or sequences of images that are displayed on a display device or any image frame that is displayed on a screen for capture by a code reader device, is disclosed in GB Application Serial No. 0714666.5.

Figure 3:
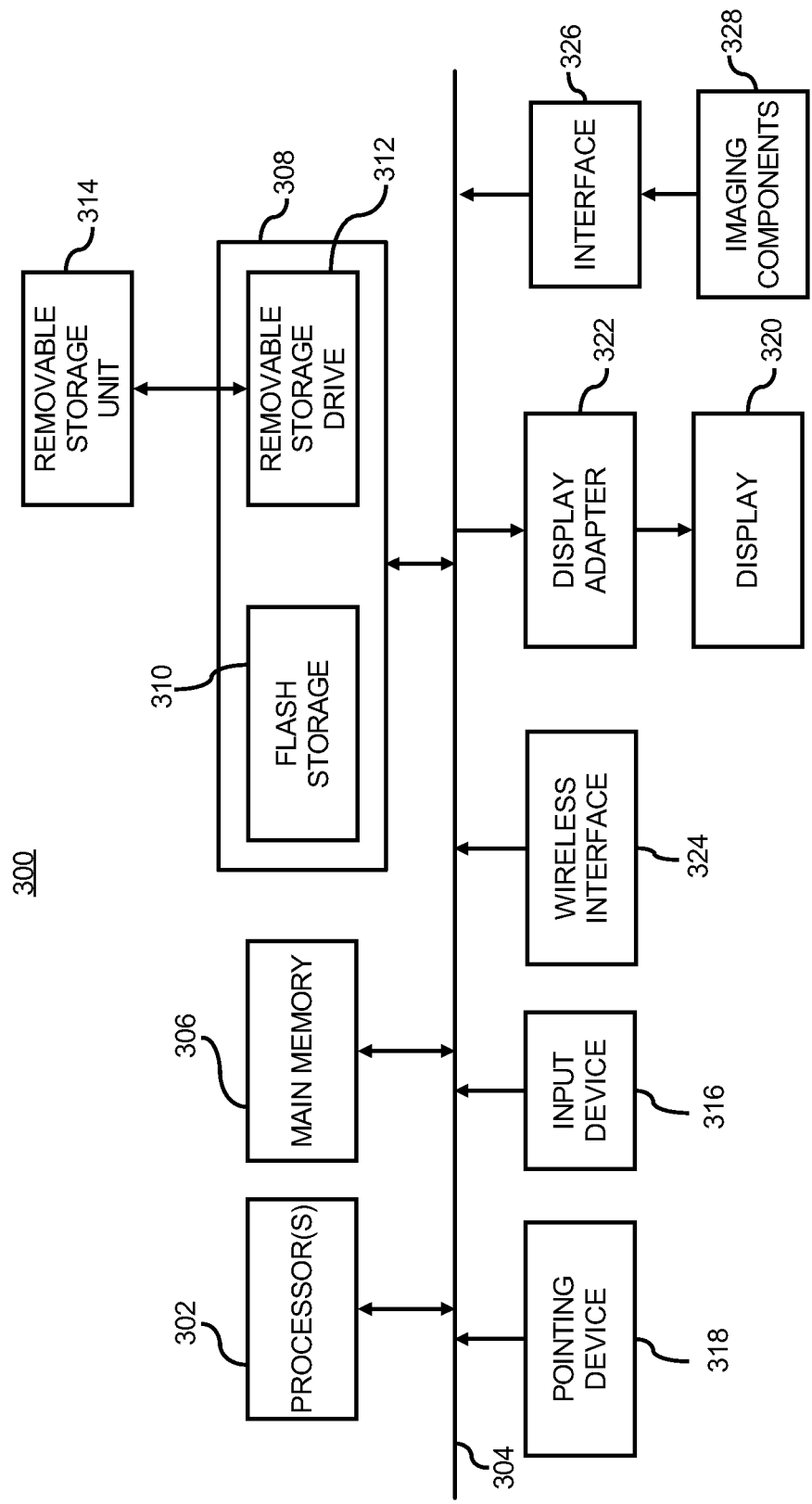
FIG. 3 shows a block diagram of a computing apparatus configured to implement or execute the methods depicted in FIGS. 2A-2D, according to an embodiment of the invention.

FIG. 3 illustrates a block diagram of a computing apparatus 300 configured to implement or execute the methods 200-220 and 250 depicted in FIGS. 2A-2D, according to an example. In this respect, the computing apparatus 300 may be used as a platform for executing one or more of the functions described hereinabove with respect to the image processor 100 depicted in FIGS. 1A-1D.

The computing apparatus 300 includes a processor 302 that may implement or execute some or all of the steps described in the methods 200-220 and 250. Commands and data from the processor 302 are communicated over a communication bus 304. The computing apparatus 300 also includes a main memory 306, such as a random access memory (RAM), where the program code for the processor 302, may be executed during runtime, and a secondary memory 308. The secondary memory 308 includes, for example, one or more flash storages 310 and/or a removable storage drive 312, representing a removable flash memory card, where a copy of the program code for the methods 200-220 and 250 may be stored.

The removable storage drive 312 reads from and/or writes to a removable storage unit 314 in a well-known manner. The computing apparatus 300 also includes an input device 316, such as a keyboard, a keypad, functional keys, etc., a pointing device, such as a tracking ball, cursors, etc., and a display 320. A display adaptor 322 may interface with the communication bus 304 and the display 320 and may receive display data from the processor 302 and convert the display data into display commands for the display 320. The processor(s) 302 may communicate over a network, for instance, a cellular network, the Internet, LAN, etc., through a wireless interface 324. In addition, an interface 326 may be used to receive an image or sequence of images from imaging components 328.

It will be apparent to one of ordinary skill in the art that other known electronic components may be added or substituted in the computing apparatus 300. It should also be apparent that one or more of the components depicted in FIG. 3 may be optional (for instance, user input devices, secondary memory, etc.).

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. An apparatus for processing images of a display, said apparatus comprising:
   a processor;
   a memory on which is stored machine readable instructions that when executed by the processor cause the processor to:
      receive a first sequence of images of the display, wherein said first sequence of images includes at least one image corrupted due to partial refreshing of the display; and
      process the first sequence of images on an image by image basis to eliminate the at least one corrupted image from at least one of the first sequence of images and a second sequence of images captured subsequent to the first sequence of images.

2. The apparatus according to claim 1, wherein the machine readable instructions are further to cause the processor to eliminate the at least one corrupted image from at least one of the first sequence of images and the second sequence of images based on a predetermined refresh-rate value and to produce processed images with the at least one corrupted image eliminated from at least one of the first sequence of images and the second sequence of images.

3. The apparatus according to claim 1, wherein the machine readable instructions are further to cause the processor to detect a refresh-timing of the display,
to eliminate the at least one corrupted image from at least one of the first sequence of images and the second sequence of images based on the detected refresh-timing of the display, and to produce processed images with the at least one corrupted image eliminated from at least one of the first sequence of images and the second sequence of images.

4. The apparatus according to claim 1, wherein the machine readable instructions are further to cause the processor to receive the processed images and to produce a resource based on the processed images.

5. The apparatus according to claim 4, wherein the machine readable instructions are further to cause the processor to build a visually-symbolic resource from the processed images, to recognize the visually-symbolic resource, and to produce the resource.

6. The apparatus according to claim 1, wherein the machine readable instructions are further to cause the processor to determine a phase-offset from a refresh-timing of the display based on the first sequence of images and to receive the second sequence of images, wherein the phase-offset enables the second sequence of images to be received without having been corrupted due to partial refreshing of the display.

7. A method of processing images of a display, said method comprising:
receiving a first sequence of images of the display, said first sequence of images having at least one image corrupted due to partial refreshing of the display;
processing the received first sequence of images on an image by image basis to eliminate the at least one corrupted image from at least one of the first sequence of images and a second sequence of images captured subsequent to the first sequence of images; and
producing processed images with the at least one corrupted image eliminated from at least one of the first sequence of images and the second sequence of images.

8. The method according to claim 7, further comprising:
identifying which of the images in the first sequence of images is likely to be corrupted due to partial refreshing of the display; and
eliminating the identified images.

9. The method according to claim 7, further comprising:
detecting a refresh-timing of the display;
eliminating at least one corrupted image from the first sequence of images based on the detected refresh-timing of the display; and
wherein producing the processed images further comprises producing process images to include the first sequence of images with the at least one corrupted image eliminated.

10. The method according to claim 7, further comprising:
producing a resource from information contained in the processed images.

11. The method according to claim 10, wherein producing the resource further comprises:
building a visually-symbolic resource from the processed images;
recognizing the visually-symbolic resource; and
producing the resource from the recognized visually-symbolic resource.

12. The method according to claim 7, further comprising:
determining a phase-offset of the display based on the first sequence of images; and
receiving the second sequence of images using the determined phase-offset to eliminate corrupted images from the second sequence of images due to partial display refreshes.

13. The method according to claim 12, further comprising:
generating a sample-time control signal from the determined phase-offset; and
receiving the second sequence of images in response to the sample-time control signal.

14. A non-transitory computer readable storage medium on which is embedded one or more computer programs, said one or more computer programs implementing a method for reading a visually-symbolic resource, said one or more computer programs comprising computer readable code to:
receive a first sequence of images of the display, said first sequence of images having at least one image corrupted due to partial refreshing of the display;
process the received first sequence of images on an image by image basis to eliminate the at least one corrupted image from at least one of the first sequence of images and a second sequence of images captured subsequent to the first sequence of images; and
produce processed images with the at least one corrupted image eliminated from at least one of the first sequence of images and the second sequence of images.

15. The non-transitory computer readable storage medium according to claim 14, further comprising computer readable code to:
produce a resource from information contained in the processed images.

* * * * *